(12) United States Patent
Tao (10) Patent No.: US 7,388,578 B2
(45) Date of Patent: Jun. 17, 2008

(54) TOUCH DISPLAY PDA PHONE WITH SLIDE KEYPAD

(75) Inventor: Di Tao, Nanjing (CN)

(73) Assignee: Nokia Corporation, Espoo (FI)

( * ) Notice: Subject to any disclaimer, the term of this patent is extended or adjusted under 35 U.S.C. 154(b) by 336 days.

(21) Appl. No.: 10/883,225

(22) Filed: Jul. 1, 2004

(65) Prior Publication Data

US 2006/0005131 A1    Jan. 5, 2006

(51) Int. Cl.
*G06F 3/041* (2006.01)
(52) U.S. Cl. .................... 345/173; 345/158; 455/575.4
(58) Field of Classification Search ........ 345/156–158, 345/173, 179, 901, 903, 905; 455/556.1, 455/556.2, 575.4
See application file for complete search history.

(56) References Cited

U.S. PATENT DOCUMENTS

| 6,708,021 | B1 * | 3/2004 | Shim et al. ................. 455/90.1 |
| 6,894,661 | B1 * | 5/2005 | Tuli ............................ 345/1.1 |
| 6,972,749 | B2 * | 12/2005 | Hinckley et al. ............ 345/173 |
| 2002/0067346 | A1 * | 6/2002 | Mouton ...................... 345/173 |
| 2003/0006892 | A1 * | 1/2003 | Church ....................... 340/439 |
| 2003/0080947 | A1 * | 5/2003 | Genest et al. ............... 345/173 |
| 2003/0231143 | A1 * | 12/2003 | Nakamura et al. ........... 345/1.1 |
| 2003/0231168 | A1 * | 12/2003 | Bell et al. ................... 345/173 |
| 2004/0263486 | A1 * | 12/2004 | Seni ............................ 345/173 |
| 2005/0020323 | A1 * | 1/2005 | Kim ......................... 455/575.1 |
| 2005/0111735 | A1 * | 5/2005 | Sheinin ...................... 382/187 |

\* cited by examiner

*Primary Examiner*—Richard Hjerpe
*Assistant Examiner*—Kimnhung Nguyen
(74) *Attorney, Agent, or Firm*—Perman & Green, LLP (57) ABSTRACT

A user interface for an electronic device is constructed having a touch sensitive screen which may be operated in multiple configurations. A shuttle keypad is slidably mounted on the device with general function keys and buttons for providing such operations as entering and cursor movements and soft keys programmed to a selected application. The configuration of the touch sensitive screen is changed in response to the position of the shuttle keypad.

49 Claims, 7 Drawing Sheets

TOUCH DISPLAY PDA PHONE WITH SLIDE KEYPAD

BACKGROUND OF THE INVENTION

1. Field of the Invention

The subject matter of this application relates to a device that combines the functions of a personal digital assistant (PDA), a telephone and other devices. More specifically, this application describes a unique arrangement of a touch screen in combination with a slidable keypad.

2. Brief Description of Related Developments

With the introduction of multi-function electronic devices, it has become increasingly more difficult to design a user interface that enables the user to access the many types of functions and applications available in small hand held devices. It is a particular challenge to present a simple and efficient means by which the user can communicate with the device for browsing, selecting, and operating amidst the wide array of choices. The user interface generally consists of a keypad for entering data and commands and a display screen for presenting information relating to operation of the selected function.

The touch sensitive screen has become very useful in combining the function of both display and keypad in multifunction devices. It is a purpose of this invention to combine a touch sensitive screen with a moveable keypad to maximize the use of the display screen, while making usage of the device more convenient within the different functions available. In European Patent Application Serial No. EP 0 804 009 A2, a touch screen display for a portable device is used in conjunction with other types of screens to display information and provide alternate screen configurations. A movable cover serves to change display configurations on the screen, but still covers otherwise usable surface area of the device.

It is a purpose of this invention to provide a slidable element mounted on an electronic device that is operable to change the display configuration and divide the display screen into different functions, while maximizing the surface area available for a multi-function touch sensitive screen. It also a purpose of this invention to provide a slidable element that is also a keypad having keys and/or buttons connected to provide generic operational functions for a multifunction electronic device.

SUMMARY OF THE INVENTION

A PDA/cellular telephone combination is constructed with a housing that encloses the components of the device in a known configuration to provide a wide variety of functions and applications. These components include, for example a microprocessor, mobile telephone, PDA, display driver firmware, memory and other processor components depending on the functions offered to the user. A touch sensitive display screen is mounted or integrated on a front surface of the housing and is constructed to provide a user interface adapted to perform the functions of such elements as, for example, a communications keypad, a PDA keyboard, note pad and data display depending on the operational needs of the user.

A shuttle keypad is mounted for sliding movement back and forth on the housing over the touch sensitive display screen to act as a frame, window, or view divider. The shuttle keypad is operatively connected to the microprocessor control unit and in particular to a display driver. The display driver is designed to alter the display on the display screen in response to movement and position of the shuttle keypad. Movement of the shuttle keypad causes the touch sensitive display to change from, for example, a PDA format to a communications format. The orientation and position of the display may also be changed to accommodate the user in the most convenient manner consistent with the function selected. In the preferred embodiment, the shuttle keypad may be moved to at least three positions which correlate to three modes of operation: for example, call active position with notepad available; PDA or phone active with full display available; and PDA or phone active with maximum display available.

The operable positions can be expanded or altered for adaptation to alternative or additional modes of operation. In addition the operable orientation of the device may be changed so that the display is in horizontal or landscape style orientation as opposed to a vertical or portrait style orientation. Left or right hand users could more easily be supported in landscape orientation.

In one alternative embodiment the shuttle keypad operates solely as a screen divider to provide alternative display configurations, i.e., cell phone and notepad on either side of the shuttle keypad. In the simplest form of the latter embodiment, the keypad would be absent keys and screen configuration would be otherwise selected by position of the keypad or other means.

BRIEF DESCRIPTION OF THE DRAWINGS

The device of this invention is explained in more detail below with reference to the accompanying drawing, in which:

FIG. 1b is a side view of the PDA/phone shown in FIG. 1a;

FIG. 1c is a top view of the PDA/phone shown in FIG. 1a;

FIG. 3b is a side view of the PDA/phone of FIG. 3a;

FIG. 7b is an end view of the shuttle keypad shown in FIG. 7a;

DETAILED DESCRIPTION OF THE PREFERRED EMBODIMENT(S)

A multifunctional device 10, for example a combination PDA cellular telephone incorporating features of the present invention is illustrated in the figures. Although the present invention will be described with reference to the embodiments shown in the drawings, it should be understood that the present invention may have many alternate forms. In addition, any suitable size, shape or type of elements or materials could be used.

Figure 1A:
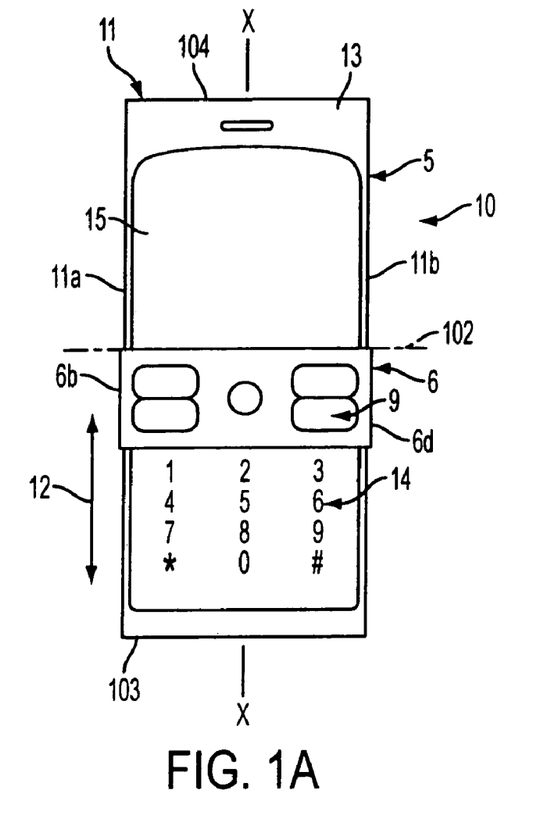
FIG. 1a is a front view of one embodiment of a PDA/phone device incorporating features of the subject invention.
Figure 6:
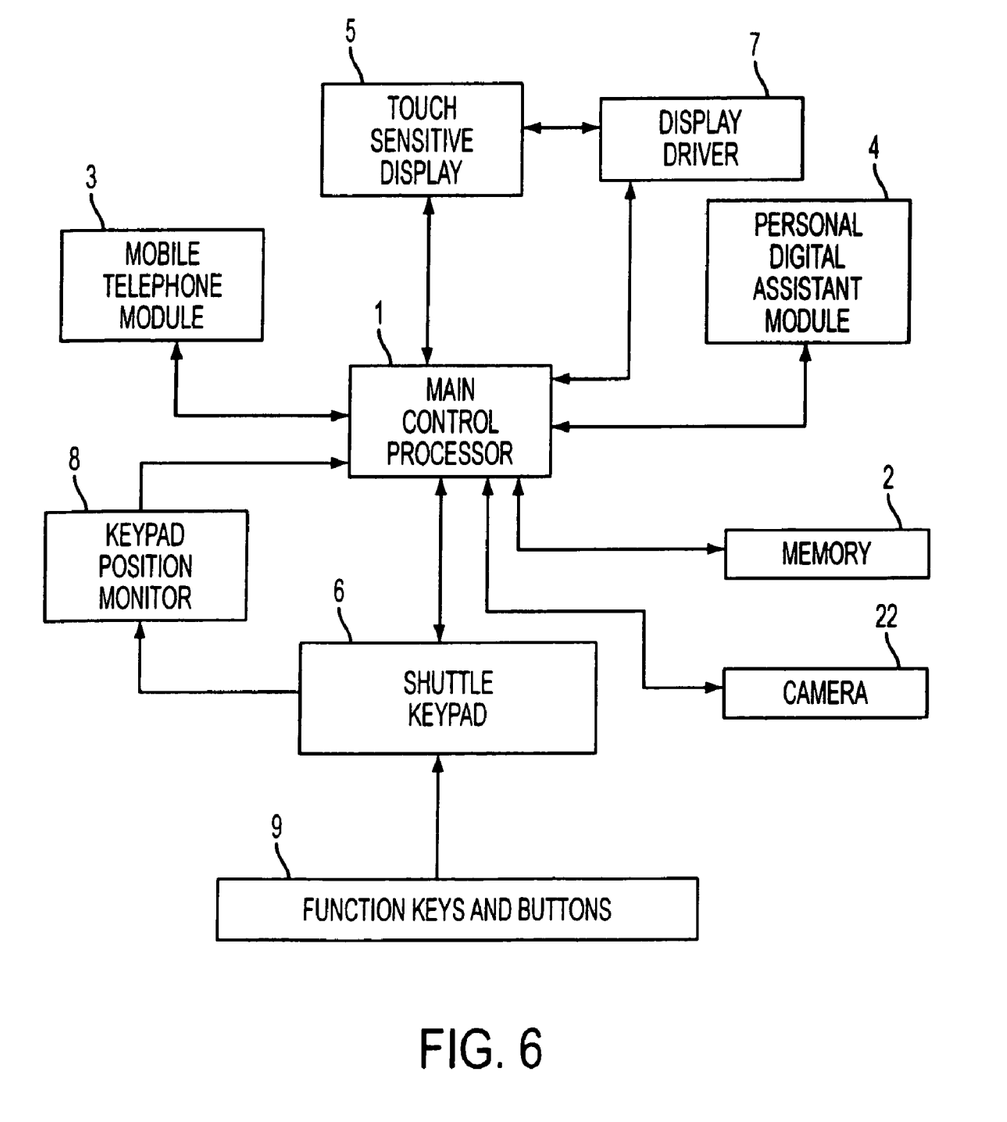
FIG. 6 is a block diagram of one embodiment of a system incorporating features of the present invention.

As shown in FIG. 6, the multifunction device 10, selected to illustrate the features of this invention, comprises a system of components that are operatively interconnected to provide the combined functions of a PDA and mobile telephone with selected illustrative applications. A main control processor 1 is supported by a memory 2 and processes data and commands from a mobile telephone module 3 and a PDA module 4. The user interface of this device includes a touch sensitive display 5 and a shuttle keypad 6. The display 5 has an associated driver 7. Shuttle keypad 6 is mounted on the device for sliding motion into several positions that are monitored by keypad position monitor 8. As shown in FIG. 1a, the sliding keypad supports multiple keys and buttons 9 that are instrumental in operating the device.

PDA/phone 10 is constructed with a housing 11 that encloses the components of the device 10 in the general configuration illustrated in FIG. 6 to provide a wide variety of functions and applications.

A user interface in the form of a touch sensitive display screen 5 is mounted on front surface 13 of housing 11 and is constructed to provide a variety of key or spot sensitive arrangements. As an example, an alphanumeric keyboard, is shown in section 14 of display screen 5, in FIG. 1a, that allows the entry of numbers, text and symbols or other commands, that might be associated with a PDA or phone, into the multifunction device 10. Also another section 15 of the touch sensitive display 5 could comprise a write sensitive portion for notes and a data display depending on the operational needs of the user. Display screen 5 is controlled by display driver 7 and main control processor 1 to provide multiple combinations of displays, as described below, as selected by the user.

In many applications, it will be advantageous to adapt at least a portion of the display 5 for the display of text to provide menus, status and other operational information to the user. Text display could be provided as a selection in any mode of operation.

The arrangement of the keyboard of section 14 in FIG. 1a is merely exemplary, and any suitable arrangement of keys and functions, including the types of buttons and keys, is within the scope of the invention.

A second component of the user interface of the system of this application is shuttle keypad 6, which is mounted for sliding movement, generally parallel to the longitudinal axis x-x of device 10, back and forth on the housing 11, as shown by arrow 12. Shuttle keypad 6 surrounds housing 11, encompassing front surface 13 and the display screen 5.

Figure 7A:
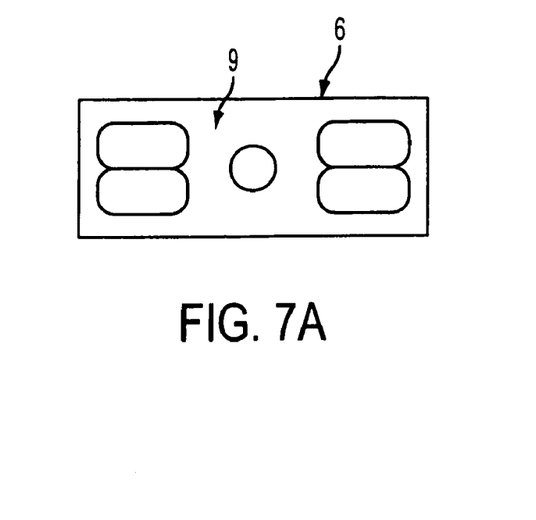
FIG. 7a is a front view of one embodiment of a shuttle keypad device incorporating features of the present invention.
Figure 7B:
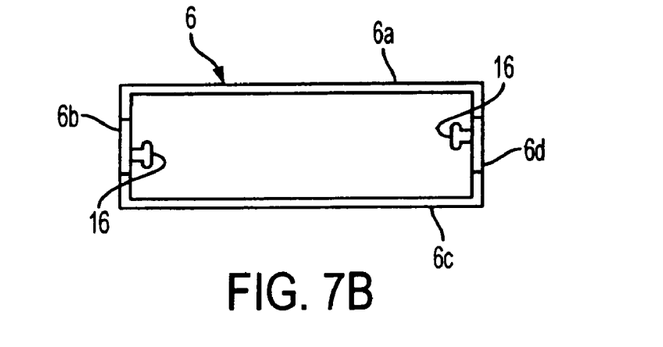
Figure 7C:
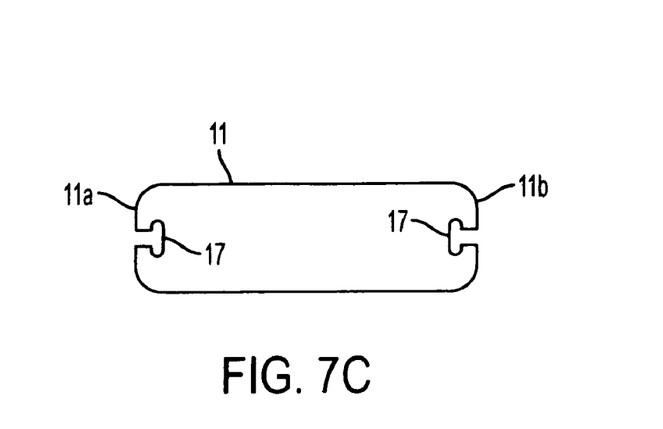
FIG. 7c is an end view of the PDA/phone.

Shuttle keypad 6, as shown in FIGS. 7a, 7b, and 7c is constructed of molded plastic having front wall 6a, side walls 6b and 6c, and back wall 6d integrally formed to surround the housing 11. Rails 16 extend inward from the inner surface of side walls 6b and 6d, as shown in FIG. 7b, to engage mating guide slots 17 constructed in housing 11, as shown in FIG. 7c. It is a feature of the present invention to be able to move the shuttle keypad 6 over the front face of the device 10 and cause the PDA/phone 10 to change modes as the shuttle keypad 6 is repositioned or moved over the front face of the housing 11.

Figure 3A:
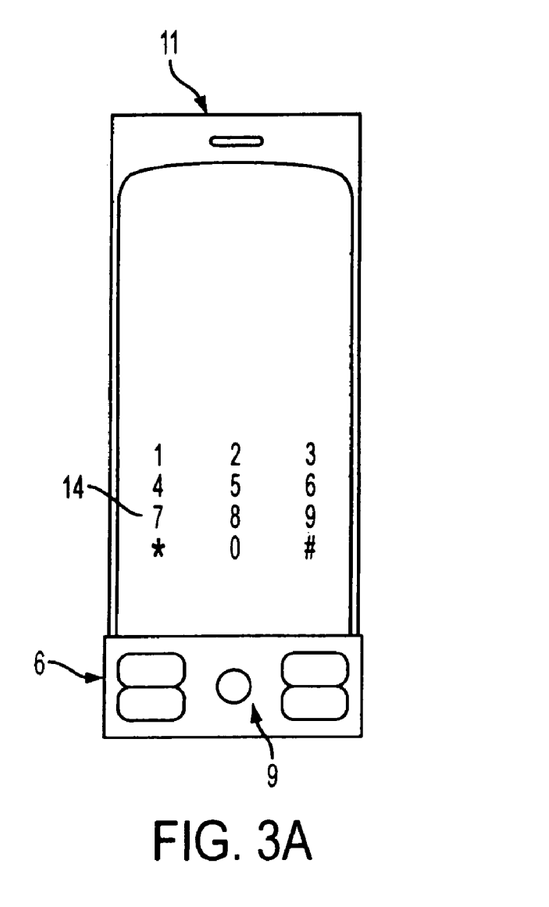
FIG. 3a is a front view of one embodiment of a PDA/phone device incorporating features of the present invention illustrating a shuttle keypad in another mode of operation.

It is also a feature of this invention to construct the shuttle keypad 6 in the form of a narrow belt of limited width so that it does not take up an inordinate amount of space on the front surface 13 of housing 11. By limiting the width of the shuttle keypad or element 6 to under two inches, all of the functions provided by the element 6 can be accomplished without interfering unnecessarily with the size of touch sensitive screen 5. A narrow width also allows for the positioning of the shuttle keypad 6 to maximize the size of the touch sensitive screen 5, as shown in FIG. 3a. The side walls 6b and 6d of the shuttle keypad 6 engage slots 17 in side portions 11a and 11b of the housing 11.

Figure 5:
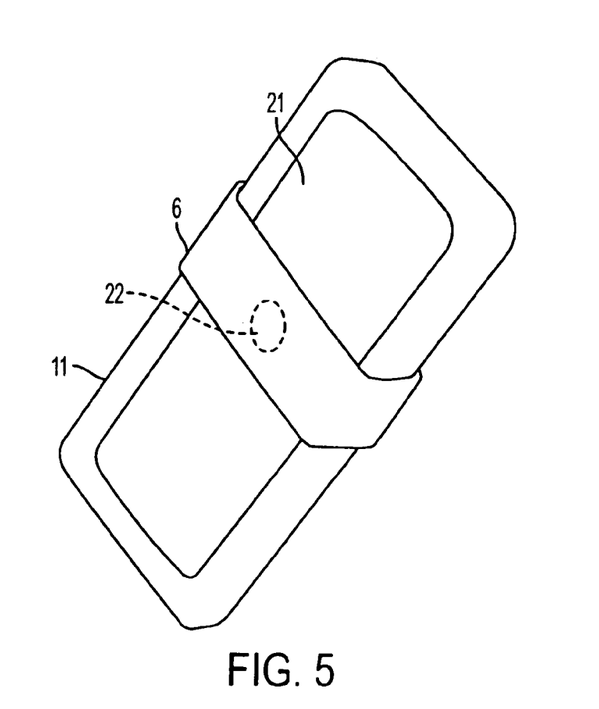
FIG. 5 is a perspective back view of the PDA/phone shown in FIG. 4.

In one embodiment, the shuttle keypad 6 could surround or encompass the housing 11 as one complete unit, extending around the back of the housing 11, as illustrated in FIG. 5. A suitable spacing is maintained between the shuttle keypad 6 and the housing 11 to allow for relatively unobstructed movement of the shuttle keypad 6 between the different positions. Movement of the shuttle keypad 6 is generally limited by the extremities of slot 17 or by appropriately positioned stops constructed therein.

Figure 1B:
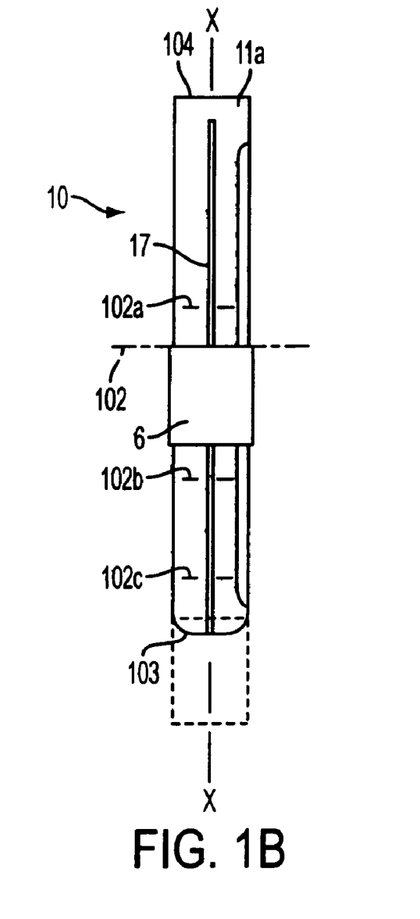
Figure 2:
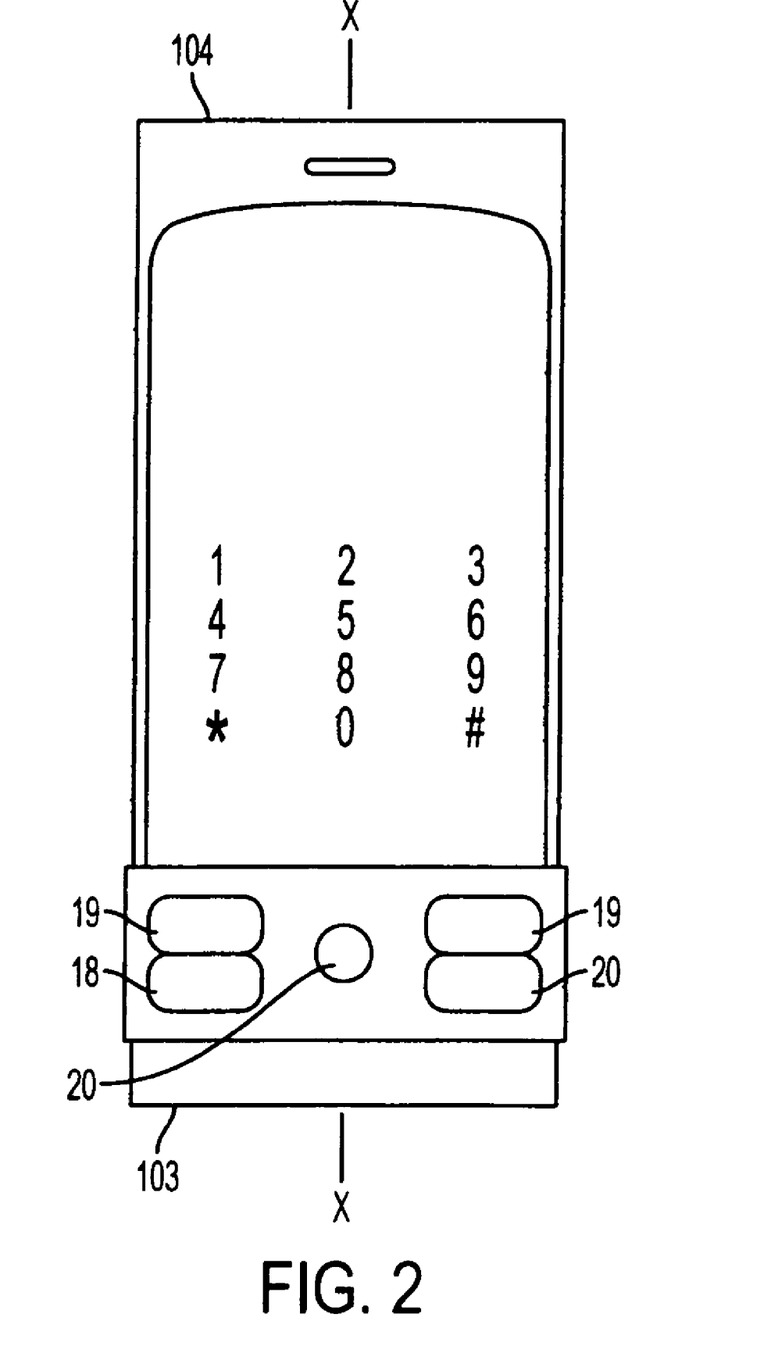
FIG. 2 is a front view of one embodiment of a PDA/phone device incorporating features of the present invention illustrating a shuttle keypad in one mode of operation.

As shown in FIGS. 1a, 2, and 3a, in a preferred embodiment, there are three positions into which the shuttle keypad 6 may be moved to provide 3 modes of operation. The three positions may be visually indicated by markers on the side of housing 11, or by feel through appropriately placed detents within slots 17. Movement of the shuttle keypad is limited by the extremities of slot 17 or by appropriately positioned stops constructed therein. These positions are shown in phantom as 102a, 102b, and 102c in FIG. 1b, and are correlated to specific modes of operation, as shown in FIGS. 1a, 2, and 3a. The range of movement of the keypad 6, however, is limited only by the limits of the housing 11 and can extend from top edge 104 to bottom edge 103. The modes of operation may consist of, for example, call active position with notepad available (mode A); PDA or phone active with full display available (mode B); and PDA or phone active with maximum display available (mode C).

Although three positions and modes are described herein, in alternate embodiments, any suitable number of positions and modes can be implemented. Movement of the shuttle keypad 6 could provide a tactile feel to the user that informs the user of the movement as well as engagement of a position that may also result in a mode change.

Location of the keypad 6 could also be indicated by device 10 in the form of a visual indicator, either on a display portion of the user interface 5, or the shuttle keypad 6, that informs the user of the respective position of the keypad 6 and mode of the device 10. The visual indicator on the user interface 5 could include an alphanumeric designation, a symbol or a light of any suitable color or colors. The keypad 6 could also include similar types of indicators. In one embodiment, the device 10 could also be adapted to provide an oral indicator of movement of the keypad 6 and engagement of a mode.

In a preferred embodiment, the keypad 6 is situated to divide touch sensitive screen 5 into two sections 14 and 15. In this position, complementary functions can be provided within the sections, for example, as shown in FIG. 1a, an alphanumeric keypad could be provided in section 14 of touch sensitive display screen 5, that could be a communication keypad and a writable screen could be provided in section 15 for jotting down notes related to a particular phone conversation. When the shuttle keypad 6 is used to divide touch screen 5, it can be positioned at midline 102, as shown in FIG. 1a, or to provide other display proportions, for example ⅓-⅔ or ¼-¾.

Figure 1C:
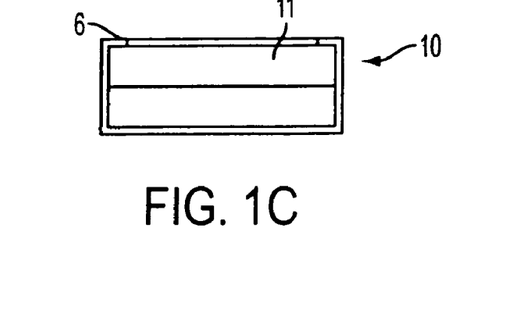
Figure 8:
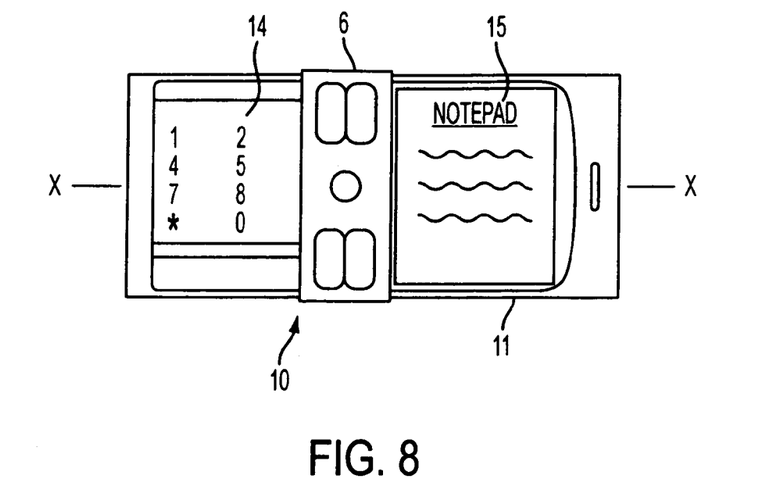
FIG. 8 is a front view of an alternative embodiment incorporating features of the present invention having landscape orientation.

Although the orientation of the device 10 is shown in FIGS. 1-3 as generally having its longitudinal axis, x-x, vertical (portrait), the device 10 could, be adapted for use in a horizontal (landscape) orientation, as shown in FIG. 8. In the latter instant, displays would be selected for the landscape orientation by the user and the functions provided adapted to accommodate right hand or left hand use.

In order to monitor the position of keypad 6 and to communicate operation of the keys and buttons 9, keypad 6 is connected through an appropriate bus to shuttle monitor 8 and main control processor 1. This connection may be accomplished by flexible printed wire board, ribbon cable, or contacts established between rails 16 and slots 17.

As shown in FIG. 1a, a series of keys or buttons 9 may be supported on the keypad 6, that are instrumental in the generic or specific operation of the device 10. The keypad 6 could have multiple keys, such as enter key 18, cursor keys 19, and soft keys 20. Depending on the applications provided, the soft keys 20 could be programmed for a variety of alternate functions in conjunction with touch sensitive display 5. Control processor 1 could adjust the functions of the keys, in particular, the soft keys 20 according to the position of the shuttle keypad.

In alternate embodiments, any suitable number and types of keys or buttons can be provided on the shuttle keypad 6. In one embodiment, the functions of the different keys can include a send key, an end key, an arrow key (which could also comprise a joy stick or track ball) and a menu key. The choices and key functionality's can generally include functions generally associated with mobile phones, PDAs, game players (see FIG. 9) and other forms. The keypad of element 6 could also comprise a supplementary touch screen or graphic keypad operable on the primary touch screen.

In operation the display driver 7 is designed to alter the configuration of information displayed on the display screen 5 in response to movement of the shuttle keypad 6. A signal is generated by monitor 8 and sent to microprocessor 1 indicative of the position of keypad 6. The user may then select from a particular group of display configurations which vary according to the position or a predetermined display configuration may be presented, for example: active communication keypad and note pad of mode A.

As shown in FIGS. 1a, 2, and 3a, in the preferred embodiment, there are three modes of operation provided. In mode A, the shuttle keypad 6 is positioned at a central location 102a and the display screen 5 is divided by keypad 6 into a communication style keyboard in screen section 14 in the lower section and a note pad in the upper screen section 15. This would be the basic communication mode of operation in which the device would operate as a relatively standard style of cellular telephone.

Mode B is shown in FIG. 2, in which the shuttle keypad 6 is positioned at line 102b near the bottom of touch screen 5. In mode B, the device can be programmed to operate either as a PDA or a mobile phone with most of the touch screen display 5 available for use.

In mode C of FIG. 3a, the shuttle keypad 6 is positioned at 102c, at the lower edge 103 of housing 11, shown in phantom in FIG. 3c, and extends off of the display screen 5 to maximize the size of the display, while allowing both PDA and mobile phone usage. It is a feature of the present invention to allow a user to move or reposition the shuttle keypad 6 along the device 10 to enable and disable different modes and functions of the PDA/phone 10, which might depend on the position of the shuttle keypad 6 on the device 10 at the time.

Figure 3B:
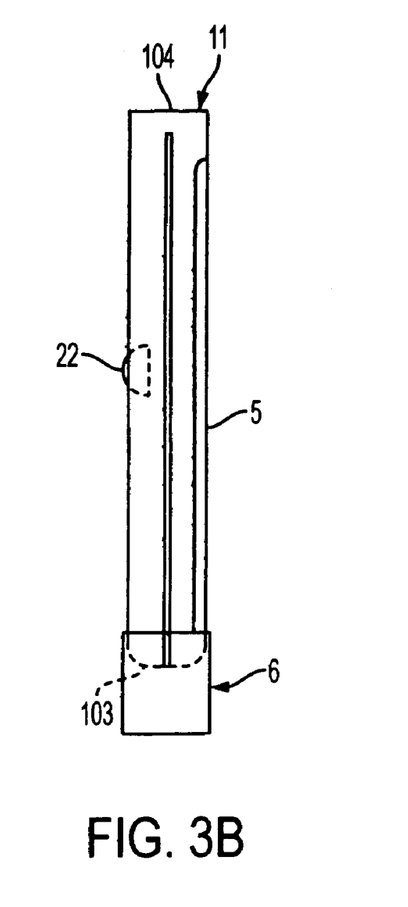
Figure 4:
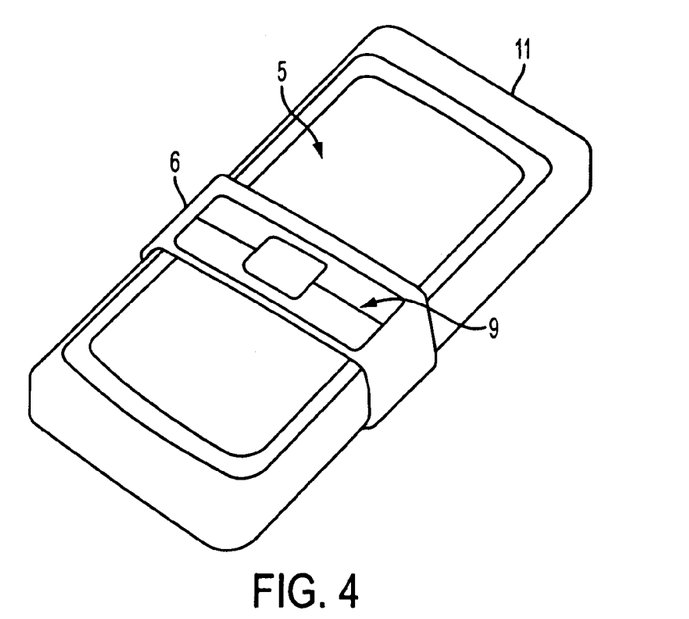
FIG. 4 is a perspective front view of one embodiment of a PDA/phone device incorporating features of the present invention.

In an alternative embodiment, the multifunction device 10 could include other devices and components suitable for use with a mobile phone and PDA. For example, referring to FIG. 3b, a camera1 22 could be integrated to form part of the device with a lens 23 extending from the back 21 of the housing 11, as shown in FIG. 3b. The keypad 6 would act as a cover for camera 22, when positioned in mode A. Use of camera 22 would require repositioning of the device to expose lens 23, such as in the positions of 102b and 102c. In these positions, the keys 18-20 of the keypad 6 can be programmed to control the functionality of the camera 22. A portion of display screen 5 would be adapted to display what is in the field of the lens 23.

Figure 9:
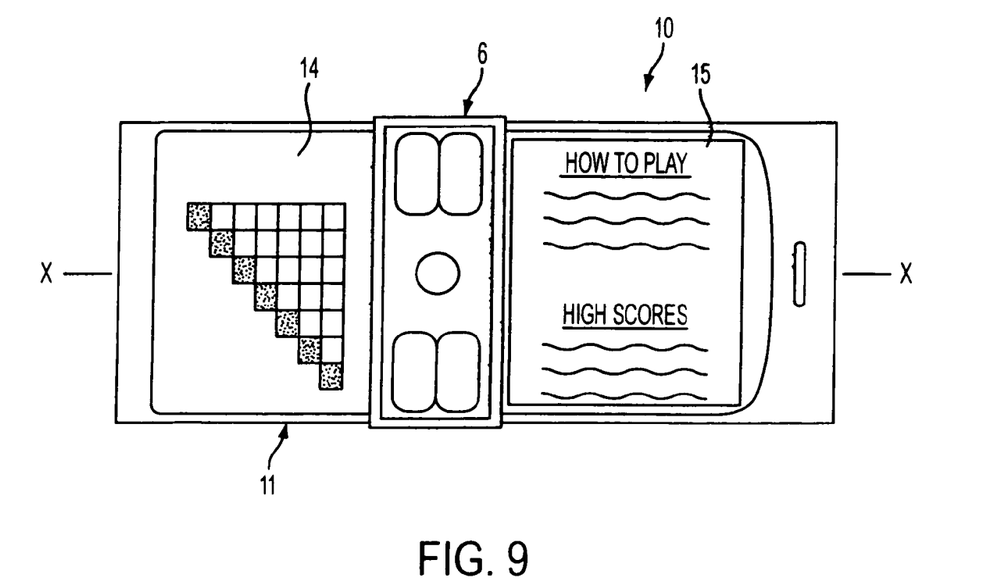
FIG. 9 is a front view of an alternative embodiment of the present invention incorporating features related to a gaming application.

In another alternative embodiment, as shown in FIG. 8, the shuttle keypad 6 may operate solely as a screen divider to provide alternative display configurations, i.e., cell phone and notepad on either side of the shuttle keypad. In the simplest form of the latter embodiment, the keypad would be absent keys and screen configuration would be otherwise selected by position of the keypad or other means. This embodiment may be particularly useful in game type applications, for example to divide image display and a touch sensitive keyboard display. By using the landscape orientation, as shown in FIG. 8, the device 10 could be adapted for either right hand or left hand operation further facilitating use in a gaming application, as shown in FIG. 9.

In this manner a user interface is provided through which an extremely flexible combination of functional configurations may be provided to accommodate the many applications which are currently available through a multifunction hand held electronic device. Such configurations could include, for example, a combination PDA/phone, as illustrated. During use the user can select which applications, displays, functions would be in use at the same time. The possible configurations are many, for example during a phone call, a calendar, address book, or note pad could be used. During the play of a game, scores, participants, and other lists could be displayed.

While the invention has been described with reference to specific embodiments, the description of the specific embodiments is illustrative only and is not to be construed as limiting the scope of the invention. Various other modifications and changes may occur to those skilled in the art without departing from the spirit and scope of, the invention, as defined by the claims, and it is intended that the present invention embraces all such modifications and changes within the scope of the claims.

The invention claimed is:

1. A user interface for an electronic device comprising:
    a touch sensitive display adaptable to multiple configurations;
    a shuttle keypad mounted on the electronic device for sliding motion over the touch sensitive display between multiple positions in which varying portions of said touch sensitive display are exposed to accommodate at least two of said multiple configurations and wherein the shuttle keypad is limited in size so that, in at least one of said multiple positions, the shuttle keypad divides said touch sensitive display into two portions.

2. A user interface, according to claim 1 wherein, said shuttle keypad further comprises at least one button thereon for operating a function of said electronic device.

3. A user interface, according to claim 1 further comprising a microprocessor controller for adapting the configuration of the touch sensitive display in correlation to the position of the shuttle keypad.

4. A user interface, according to claim 1, wherein, in one of said multiple positions, said shuttle keypad divides the touch sensitive display into first and second portions.

5. A user interface, according to claim 4, wherein said first portion comprises a communication keypad and said second portion comprises a notepad.

6. A user interface, according to claim 4, wherein said first portion comprises a gaming application and said second portion comprises a list of participants.

7. A user interface, according to claim 1, wherein, in normal operation, said electronic device is oriented in a portrait type orientation.

8. A user interface, according to claim 1, wherein, in normal operation, said electronic device is oriented in a landscape type orientation.

9. A user interface, according to claim 1, wherein, in one of said multiple positions, said shuttle keypad is positioned to expose a full display portion and in said position said shuttle keypad is within a boundary of the device.

10. A user interface, according to claim 9, wherein said full display portion comprises a combination personal digital assistant and communications display.

11. A user interface, according to claim 1, wherein, in one of said multiple positions, said shuttle keypad is positioned to expose a maximum display portion and in said position said shuttle keypad extends beyond a boundary of the device.

12. A user interface, according to claim 1, wherein said shuttle keypad comprises multiple keys or buttons and wherein at least one of said keys or buttons is programmable to different functions.

13. A user interface, according to claim 12, wherein said microprocessor controller also adapts said function said programmable key in correlation to the position of said shuttle keypad.

14. An electronic device comprising:
a housing;
a personal digital assistant module mounted within said housing for providing multiple related functions;
a mobile telephone module mounted within said housing for providing a communication function;
a touch sensitive display adaptable to multiple configurations; and
a shuttle keypad mounted on the electronic device for sliding motion thereon, over the touch sensitive display, between multiple positions in which varying portions of said touch sensitive display are exposed and wherein the shuttle keypad is limited in size so that, in at least one of said multiple positions, the shuttle keypad divides said touch sensitive display into two portions.

15. An electronic device, according to claim 14, further comprising a microprocessor controller for controlling the functions of said personal digital assistant module and said mobile telephone module and for adapting the configuration of the touch sensitive display in correlation to the position of the shuttle keypad.

16. An electronic device, according to claim 14, wherein a first of said multiple positions is correlated to said mobile telephone module and, in said first position, said shuttle keypad divides the touch sensitive display into first and second portions, wherein said first portion comprises a communication keypad and said second portion comprises a notepad.

17. An electronic device, according to claim 14, wherein, a second of said multiple positions is correlated to a combination of said personal digital assistant and said mobile telephone module, and, in said second position, said shuttle keypad is positioned to expose a full display portion and in said position said shuttle keypad is within a boundary of the device.

18. An electronic device, according to claim 17, wherein said full display portion comprises a combination personal digital assistant and communications display.

19. An electronic device, according to claim 14, wherein, in a third of said multiple positions, said shuttle keypad is positioned to expose a maximum display portion and in said third position said shuttle keypad extends beyond a boundary of the device.

20. An electronic device, according to claim 14, further comprising a digital camera mounted on a back of said housing, and, in said first position said shuttle keypad acts as a cover for said digital camera.

21. A method of operating an electronic device having a touch sensitive display, comprising:
mounting a shuttle element for sliding motion on the electronic device over the touch sensitive display, between multiple positions in which varying sections of said touch sensitive display are exposed, and wherein the shuttle keypad is limited in size so that, in at least one of said multiple positions, the shuttle keypad divides said touch sensitive display into two portions;
adapting said touch sensitive display screen to have multiple configurations; and
adjusting the configuration of said touch sensitive display in response to the position of the shuttle element.

22. A method, according to claim 21, wherein said first portion comprises a communication keypad and said second portion comprises a notepad.

23. A method, according to claim 21, wherein, in one of said multiple positions, said shuttle element is positioned to expose a full display portion and in said position said shuttle element is within a boundary of the device.

24. A method, according to claim 23, wherein said full screen portion comprises a combination personal digital assistant and communications display.

25. A method, according to claim 21, wherein, in one of said multiple positions, said shuttle element is positioned to expose a maximum display portion and in said position said shuttle keypad extends beyond a boundary of the device.

26. A method, according to claim 21, wherein, said shuttle element is constructed having at least one button thereon for operating a function of said electronic device.

27. A method, according to claim 21, wherein said shuttle element is mounted on the electronic device for sliding motion between multiple positions in which varying portions of said touch sensitive display are exposed to accommodate at least two of said multiple configurations.

28. A method, according to claim 21, wherein said shuttle keypad comprises multiple keys or buttons and wherein at least one of said keys or buttons is programmable to different functions.

29. A method, according to claim 28, wherein said microprocessor controller also adapts said function of said programmable key in correlation to the position of said shuttle keypad.

30. A method, according to claim 21, wherein said first portion comprises a gaming application and said second portion comprises a list of participants.

31. A method, according to claim 21, wherein, in normal operation, said electronic device is oriented in a portrait type orientation.

32. A method, according to claim 21, wherein, in normal operation, said electronic device is oriented in a landscape type orientation.

33. A user interface for an electronic device comprising:
a touch sensitive display adaptable to multiple display configurations;
a shuttle element mounted on the electronic device for sliding motion thereon, over the touch sensitive display, between multiple positions in which varying sections of said touch sensitive display portion are exposed, and wherein the shuttle keypad is limited in size so that, in at least one of said multiple positions, the shuttle keypad divides said touch sensitive display into two portions.

34. A user interface, according to claim 33, wherein said first portion comprises a communication keypad and said second portion comprises a notepad.

35. A user interface, according to claim 33, wherein, in one of said multiple positions, said shuttle element is positioned to expose a full display portion and in said position said shuttle element is within a boundary of the device.

36. A user interface, according to claim 35, wherein said full display portion comprises a combination personal digital assistant and communications display.

37. A user interface, according to claim 33, wherein, in one of said multiple positions, said shuttle element is positioned to expose a maximum display portion and in said position said shuttle element extends beyond a boundary of the device.

38. A user interface, according to claim 33, wherein, said shuttle element is constructed having at least one button thereon for operating a function of said electronic device.

39. A user interface, according to claim 33, said shuttle element being mounted on the electronic device for sliding motion between multiple positions in which varying portions of said touch sensitive display are exposed to accommodate at least two of said multiple configurations.

40. A user interface, according to claim 33, wherein said shuttle keypad comprises multiple keys or buttons and wherein at least one of said keys or buttons is programmable to different functions.

41. A user interface, according to claim 33 further comprising a microprocessor controller for adapting the configuration of said display in correlation to the position of the shuttle keypad.

42. A user interface, according to claim 41, wherein said microprocessor controller also adapts said function of said programmable key in correlation to the position of said shuttle keypad.

43. A user interface, according to claim 33, wherein said first portion comprises a gaming application and said second portion comprises a list of participants.

44. A user interface, according to claim 33, wherein, in normal operation, said electronic device is oriented in a portrait type orientation.

45. A user interface, according to claim 33, wherein, in normal operation, said electronic device is oriented in a landscape type orientation.

46. An electronic device having a display comprising:
means for dividing the display, mounted on the electronic device, extending across the display, for sliding motion over the display; and
wherein said means for dividing is limited in size so that, in at least one of said multiple positions, the shuttle keypad divides said touch sensitive display into two portions.

47. An electronic device, said electronic device having a display and a processor, and means for dividing the display, mounted on the electronic device, extending across the display, for sliding motion over the display, and wherein the means for dividing is limited in size so that, in at least one of said multiple positions, the means for dividing divides said touch sensitive display into two portions, a program product comprising:
program code executed by the processor for causing the electronic device to monitor the position of the means for dividing;
program code executed by the processor for causing the electronic device to adapt the display for multiple configurations; and
program code executed by the processor for causing the electronic device to adjust the configuration of said display in response to the position of the means for dividing.

48. A user interface support module for an electronic device having a display screen comprising:
a shuttle element mounted on the electronic device for sliding motion thereon, over the display screen between multiple positions in which varying sections of the display screen are exposed, and wherein the shuttle element is limited in size so that, in at least one of said multiple positions, the shuttle element divides said display screen into two portions.

49. A user interface support module according to claim 48 further comprising at least one control element mounted on the shuttle element for controlling a function of the electronic device.

* * * * *